United States Patent [19]

Roy

[11] Patent Number: 5,644,763
[45] Date of Patent: Jul. 1, 1997

[54] DATABASE SYSTEM WITH IMPROVED METHODS FOR B-TREE MAINTENANCE

[75] Inventor: Shaibal Roy, Oakland, Calif.

[73] Assignee: Sybase, Inc., Emeryville, Calif.

[21] Appl. No.: 497,663

[22] Filed: Jun. 28, 1995

[51] Int. Cl.$^6$ .................................................. G06F 17/30
[52] U.S. Cl. .................................. 395/612; 395/611
[58] Field of Search .................................. 395/600, 612, 395/611; 364/200

[56] References Cited

U.S. PATENT DOCUMENTS

| | | | |
|---|---|---|---|
| 4,606,002 | 8/1986 | Waisman et al. | 364/200 |
| 4,677,550 | 6/1987 | Ferguson | 364/300 |
| 4,791,561 | 12/1988 | Huber | 364/300 |
| 4,805,099 | 2/1989 | Huber | 364/200 |
| 4,947,320 | 8/1990 | Crus et al. | 364/200 |
| 5,089,952 | 2/1992 | Bozman | 395/725 |
| 5,123,104 | 6/1992 | Levine et al. | 395/600 |
| 5,163,148 | 11/1992 | Walls | 395/600 |
| 5,204,958 | 4/1993 | Cheng et al. | 395/600 |
| 5,265,244 | 11/1993 | Ghosh et al. | 395/600 |
| 5,430,869 | 7/1995 | Ishak et al. | 395/600 |

OTHER PUBLICATIONS

Comer, d., "The Ubiquituos B-Tree", Computing Surveys, pp. 121–137 Jun. 1979.

Stevens, A., *Hypertree: A Hypertext Index Technique*, Dr. Dobb's Journal, Jun. 1990, pp. 135–136, 138–140, 154, 156–159.

Baker, M., *B–tree indexing, A look at indexing tradeoffs in dBASE, Clipper, and FoxPro*, Programmer's Journal, Nov./Dec. 1990, pp. 42–46.

Ferguson, D., *Bit–Tree*, Communications of the ACM, Jun. 1992, pp. 115–120.

Williams, W., *Supercharging Sequential Searches, Speed plus compression equals faster searches*, Dr. Dobb's Journal, Dec. 1990, pp. 54–61.

*Primary Examiner*—Thomas G. Black
*Assistant Examiner*—Jean M. Corrielus
*Attorney, Agent, or Firm*—John A. Smart; David N. Slone

[57] ABSTRACT

Database system and methods are described for maintenance of B-Tree indexes, such as are commonly used in a relational database environment. "Load patterns" are monitored, for optimizing B-Tree node splitting, based on a particular load pattern's effect on B-Tree growth. More particularly, an "ascending insert" load pattern—that is, the insertion of data records for a multi-column table where the particular records to be inserted have a fixed value for the first column and a monotonically increasing value for the subsequent column (s)—can be identified and optimized. Methods are described for splitting the B-Tree nodes or pages, not at the half-way point, but instead exactly at the point of insertion, a position where the insert row would have gone into the page (had it not overflowed). Since splitting the index nodes or pages at the insertion point all the time would lead to regression in performance (particularly for random inserts), the methods of the present invention further include steps for testing conditions which should preferably exist before pages are split at insertion points.

25 Claims, 8 Drawing Sheets

DATABASE SYSTEM WITH IMPROVED METHODS FOR B-TREE MAINTENANCE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to information processing environments and, more particularly, to maintenance of indexes to information stored in a data processing system, such as a Database Management System (DBMS).

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about underlying hardware-level details. Typically, all requests from users for access to the data are processed by the DBMS. For example, information may be added or removed from data files, information retrieved from or updated in such files, and so forth, all without user knowledge of underlying system implementation. In this manner, the DBMS provides users with a conceptual view of the database that is removed from the hardware level. The general construction and operation of a database management system is known in the art. See e.g., Date, C., *An Introduction to Database Systems*, Volume I and II, Addison Wesley, 1990; the disclosure of which is hereby incorporated by reference.

DBMS systems have long since moved from a centralized mainframe environment to a de-centralized or distributed environment. One or more PC "client" systems, for instance, may be connected via a network to one or more server-based database systems (SQL database server). Commercial examples of these "client/server" systems include Powersoft™ clients connected to one or more Sybase SQL Server™ database servers. Both Powersoft™ and Sybase SQL Server™ are available from Sybase, Inc. of Emeryville, Calif.

As the migration to client/server continues, each day more and more businesses are run from mission-critical systems which store information on server-based SQL database systems, such as Sybase SQL Server™. As a result, increasingly higher demands are being placed on server-based SQL database systems to provide enterprise-wide decision support. Accordingly, there is much interest in improving the performance of such system, particularly in terms of execution speed and reliability.

SUMMARY OF THE INVENTION

The present invention comprises a Client/Server Database System with improved methods for B-Tree maintenance. In an exemplary embodiment, the system includes one or more Clients (e.g., Terminals or PCs) connected via a Network to a Server. The Server, operating under a server operating system (e.g., UNIX) includes a Database Server System, such as Sybase SQL Server. In general operation, Clients store data in and retrieve data from one or more database tables resident on the Server. Each table itself comprises one or more horizontal rows or records divided into columns or fields of information.

For enhancing the speed in which the Database Server stores, retrieves, and processes particular data records, the Server maintains one or more database indexes on each table. A database index, which in an exemplary embodiment is maintained as a B-Tree data structure, allows the records of a table to be organized in many different ways, depending on a particular user's needs, with the speed of retrieving any particular data record significantly improved.

As more and more records are added to a particular table, the index for that table continues to grow. The present invention recognizes that how a particular index (and its supporting B-Tree) grows is influenced by particular "load patterns" of data records. Load patterns include, for example, the insertion of data records which are entirely random (in their logical order), or the insertion of data records which can be appended to the end of the table.

Of particular interest to the present invention is the load pattern of "ascending insert"—that is, the insertion of data records for a multi-column table where the particular records to be inserted have a fixed value for all but the last column and a monotonically increasing value for the last column. For such a load pattern, the conventional methodology for maintaining B-Trees by splitting nodes exactly in half is highly inefficient. Numerous half-empty nodes are unnecessarily created.

Methods of the present invention are described for improved B-Tree maintenance for "ascending insert" load patterns. Steps are described for splitting the B-Tree nodes or pages, not at the half-way point, but instead exactly at the point of insertion—where the insert row would have gone into the page (had it not overflowed). In a preferred embodiment, the index nodes or pages are not split at the insertion point at all times, however. To do so would lead to regression in performance (particularly for random inserts). Therefore, the methods of the present invention include additional steps for testing conditions which should preferably exist before pages are split at the insertion point.

DETAILED DESCRIPTION OF A PREFERRED EMBODIMENT

The following description will focus on the presently preferred embodiment of the present invention, which is operative in a network environment executing client/server database applications. The present invention, however, is not limited to any particular application or environment. Instead, those skilled in the art will find that the present invention may be advantageously applied to any application or environment requiring maintenance of B-Tree indexes, including non-SQL database management systems, word processors (e.g., indexed spell checkers), spreadsheets, and the like. Further, those skilled in the art will find that the present invention may be advantageously applied to B-Tree alternatives other than the "basic" B-Trees described by Bayer and McCreight in 1972. Variants include, for instance, $B^+$-Trees, Prefix $B^+$-Trees, Virtual B-Trees, and Binary B-Trees. The description of the exemplary embodiments which follows is, therefore, for the purpose of illustration and not limitation.

Standalone System Hardware

Figure 1A:
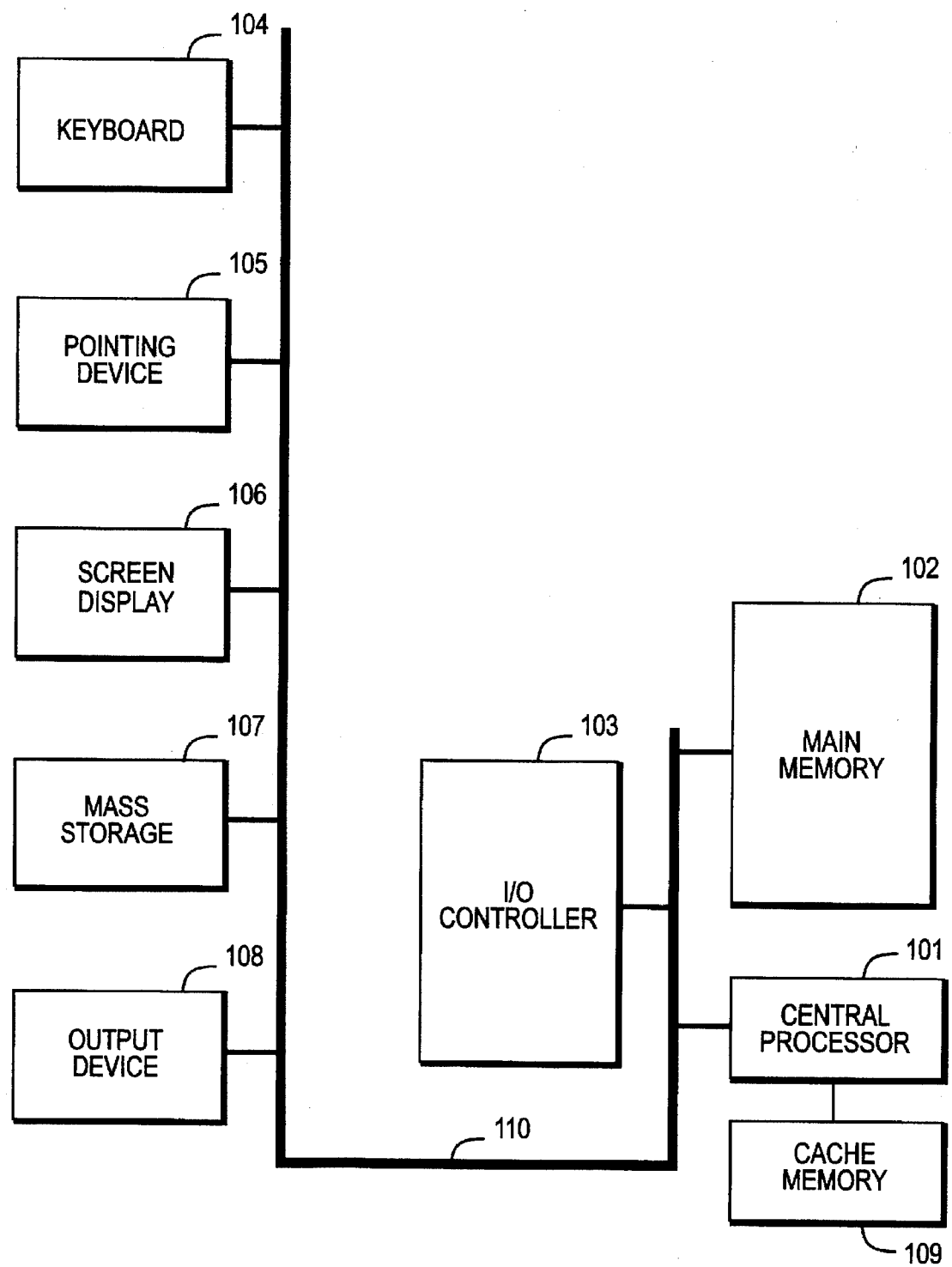
FIG. 1A is a block diagram illustrating a computer system in which the present invention may be embodied.

The invention may be embodied on a computer system such as the system 100 of FIG. 1A, which comprises a central processor 101, a main memory 102, an input/output controller 103, a keyboard 104, a pointing device 105 (e.g., mouse, track ball, pen device, or the like), a screen display device 106, and a mass storage 107 (e.g., hard or fixed disk, optical disk, magneto-optical disk, or flash memory). Processor 101 includes or is coupled to a cache memory 109 for storing frequently accessed information; memory 109 may be an on-chip cache or external cache (as shown). Additional output device(s) 108, such as a printing device, may be included in the system 100 as desired. As shown, the various components of the system 100 communicate through a system bus 110 or similar architecture. In a preferred embodiment, the system 100 includes an IBM-compatible personal computer system, available from a variety of vendors (including IBM of Armonk, N.Y.).

Standalone System Software

Figure 1B:
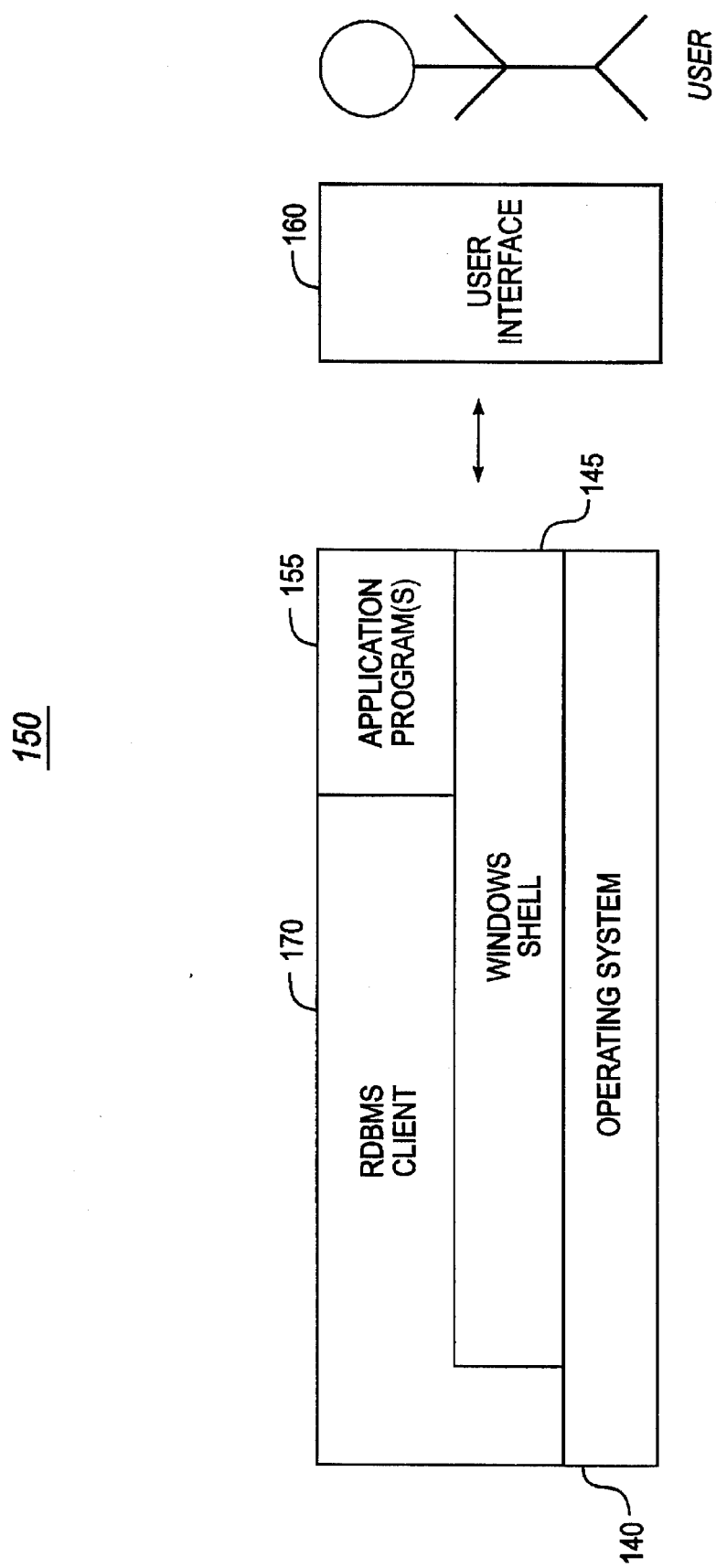
FIG. 1B is a block diagram illustrating a software subsystem for controlling the operation of the computer system of FIG. 1A.

Illustrated in FIG. 1B, a computer software system 150 is provided for directing the operation of the computer system 100. Software system 150, which is stored in system memory 102 and on disk memory 107, includes a kernel or operating system (OS) 140 and a windows shell 145. One or more application programs, such as application software 155, may be "loaded" (i.e., transferred from storage 107 into memory 102) for execution by the system 100. The system also includes a user interface 160 for receiving user commands as input and displaying user data as output.

Also shown, the software system 150 includes a Relational Database Management System (RDBMS) front-end 170. The RDBMS front-end 170 may comprise any one of a number of database front-ends, including PowerBuilder™, dBASE®, Paradox®, Microsoft® Access, or the like. In an exemplary embodiment, the front-end will include SQL access drivers (e.g., Borland SQL Links, or Microsoft ODBC drivers) for accessing SQL database server tables in a Client/Server environment.

Client/Server Database Management System

Figure 2A:
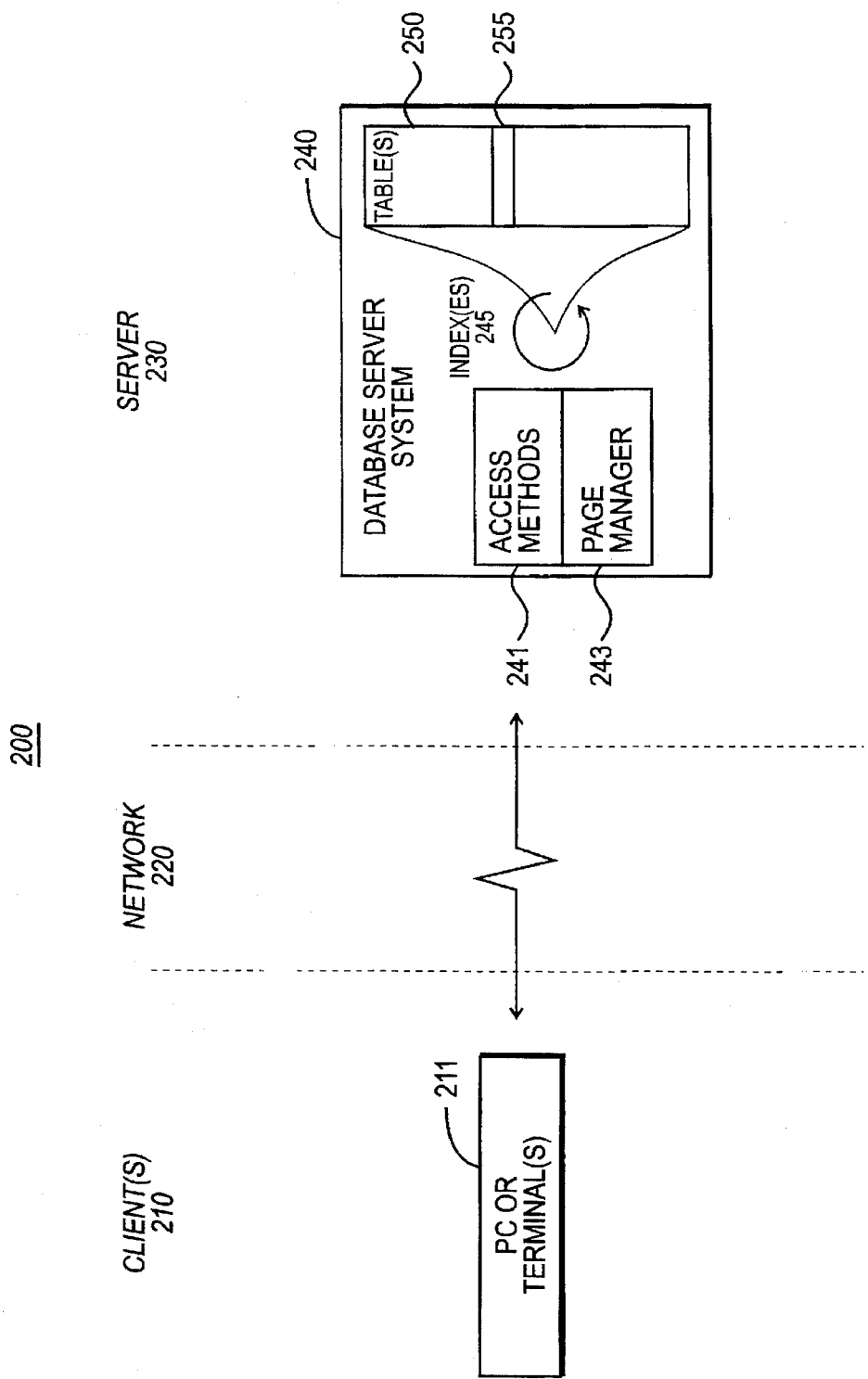
FIG. 2A is a block diagram of a client/server system in which the present invention is preferably embodied.

While the present invention may operate within a single (standalone) computer (e.g., system 100 of FIG. 1A), the present invention is preferably embodied in a multi-user computer system, such as a client/server system. FIG. 2A illustrates the general structure of a Client/Server Database System 200 suitable for implementing the present invention. As shown, the system 200 comprises one or more Client(s) 210 connected to a Server 230 via a Network 220. Specifically, the Client(s) 210 comprise one or more standalone Terminals 211 connected to a Database Server System 240 using a conventional network. In an exemplary embodiment, the Terminals 211 may themselves comprise a plurality of standalone workstations, dumb terminals, or the like, or comprise personal computers (PCs) such as the above-described system 100. Typically, such units would operate under a client operating system, such as Microsoft Windows/MS-DOS for PC clients.

The Database Server System 240, which comprises Sybase SQL Server™ (Sybase of Emeryville, Calif.) in an exemplary embodiment, generally operates as an independent process (i.e., independently of the clients), running under a server operating system such as Microsoft Windows NT (Microsoft Corp. of Redmond, Wash.), NetWare (Novell of Provo, Utah), or UNIX (Novell). The Network 220 may be any one of a number of conventional network systems, including a Local Area Network (LAN) or Wide Area Network (WAN), as is known in the art (e.g., using Ethernet, IBM Token Ring, or the like). The Network includes functionality for packaging client SQL calls and its parameters into a format (of one or more packets) suitable for transmission across a cable or wire, for delivery to the Database Server 240.

Client/server environments, database servers, and networks are well documented in the technical, trade, and patent literature. For a general discussion of database servers and client/server environments, see, e.g., Nath, A., *The Guide to SQL Server*, Second Edition, Addison-Wesley Publishing Company, 1995. For a discussion of a computer network employing Microsoft Networks/OpenNet File Sharing Protocol, see METHOD AND SYSTEM FOR OPPORTUNISTIC LOCKING IN A NETWORKED COMPUTER SYSTEM, Intl. Application No. PCT/US90/04570, Intl. Publication No. WO 91/03024, Intl. Publication Date Mar. 7, 1991. For a general introduction to a Local Area Network operating under NetWare, see Freed, L. et at., *PC Magazine Guide to Using NetWare*, Ziff-Davis Press, 1991. A more detailed discussion is available in NetWare 3.x and 4.x and accompanying documentation, which is available from Novell of Provo, Utah. The disclosures of each of the foregoing are hereby incorporated by reference.

In operation, the Client(s) 210 store data in or retrieve data from one or more database tables 250, shown in FIG. 2A. Typically resident on the Server 230, each table itself comprises one or more horizontal rows or records (tuples); each record comprises columns or fields of information. A database record, therefore, includes information which is most conveniently represented as a single unit. A record for an employee, for example, may include information about the employee's ID Number, Last Name and First Initial, Position, Date Hired, Social Security Number, and Salary. Thus, a typical record includes several categories or fields of information about an individual person, place, or thing. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed.

In operation, the Clients issue one or more SQL commands to the Server. SQL commands may specify, for instance, a query for retrieving particular data (i.e., data records meeting the query condition) from the table 250. The syntax of SQL (Structured Query Language) is well documented; see, e.g., the abovementioned *An Introduction to Database Systems*. In addition to retrieving the data from Database Server tables, the Clients also include the ability to insert new rows of data records into the table; Clients can also modify and/or delete existing records in the table.

For enhancing the speed in which the Database Server stores, retrieves, and processes particular data records, the Server maintains one or more database indexes 245 on the table. A database index, typically maintained as a B-Tree data structure, allows the records of a table to be organized in many different ways, depending on a particular user's needs. An index may be constructed as a single disk file storing index key values together with unique record numbers. The former is a data quantity composed of one or more fields from a record; the values are used to arrange (logically) the database file records by some desired order (index expression). The latter are unique pointers or identifiers to the actual storage location of each record in the database file. Both are referred to internally by the system for locating and displaying records in a database file.

As clients insert more and more data into the table 250, the index 245 continues to grow. Two parts of the Database Server System 240 play a central role in the growth of the index: Access Methods 241 and Page Manager 243. Before describing the construction and operation of each of these two modules, it is helpful to examine first the general methodology for maintaining indexes.

Indexes and B-Trees

A. B-Trees

Figure 2B:
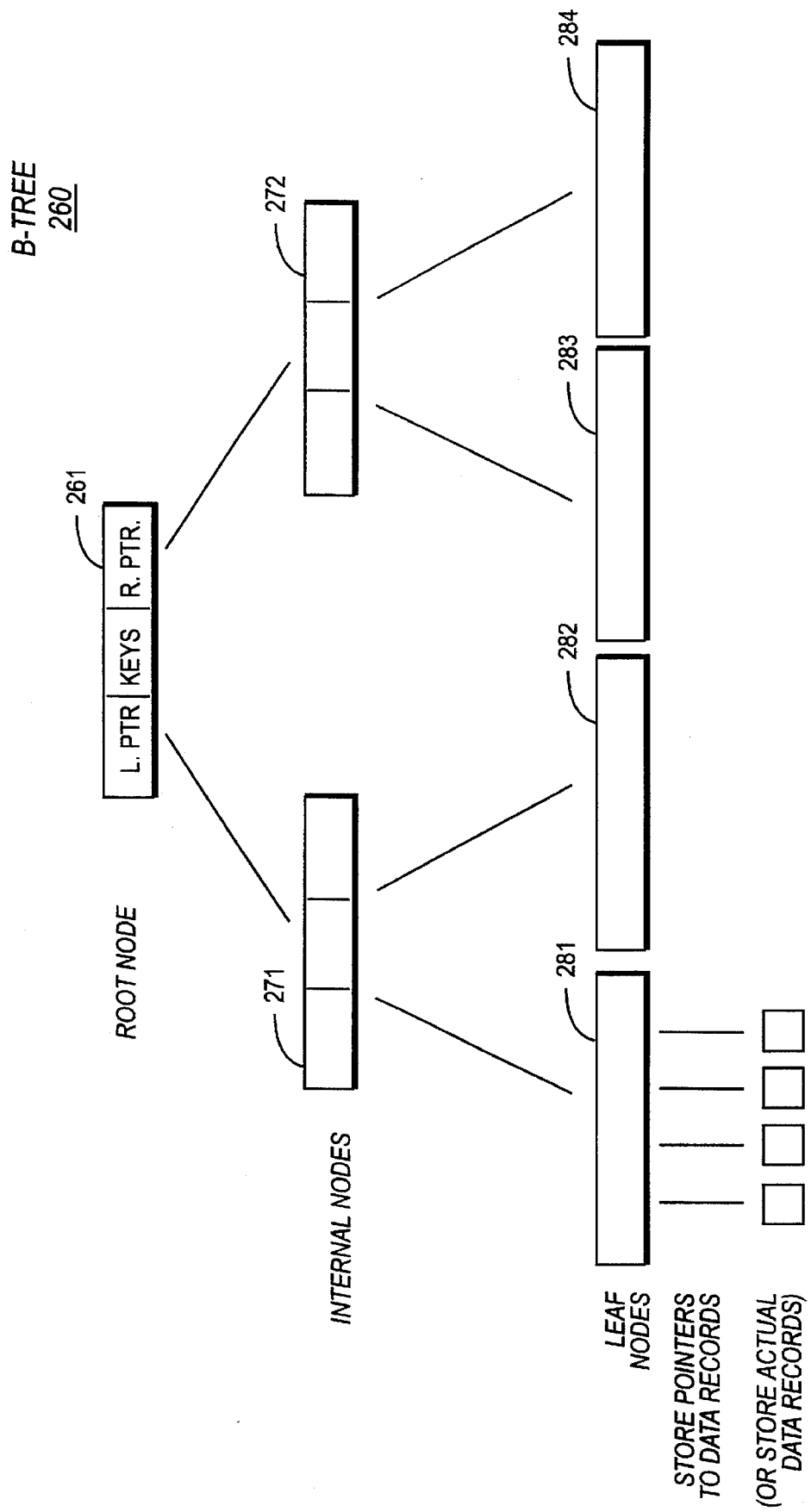
FIG. 2B is a block diagram illustrating general structure of a B-Tree.

B-Trees are fundamental to the maintenance of indexes. FIG. 2B illustrates a simple B-Tree 260, which comprises a Root Node 261, Internal Nodes 271, 272, and Leaf (terminal) Nodes 281, 282, 283, 284. As shown, therefore, a B-Tree consists of a plurality of nodes arranged in a tree. Each node may, in turn, be thought of as a block of records. As shown by the Root Node 261, each node stores one or more key values ("keys") together with pointers to children nodes (e.g., Nodes 271, 272 for Root Node 261).

Searching for a particular record in the B-Tree occurs by traversing a particular path in the tree. To find a record with a particular key value, one would maneuver through the tree comparing key values stored at each node visited with the key value sought. The results of each comparison operation, in conjunction with the pointers stored with each node, indicate which path to take through the tree to reach the record ultimately desired. Ultimately, a search will end at a particular leaf node, such as leaf node 281. The leaf node will, in turn, point to (i.e., store a pointer to or identifier for) a particular data record for the key value sought. Alternatively, the leaf nodes may for "clustered indexes" store the actual data of the data records on the leaf nodes themselves.

In contrast to the B-Tree approach, a sequential or linear scan from the beginning of a database table, comparing each record along the way, is exceedingly slow. There, all of the blocks of records would have to be visited until the record sought is finally located. For a table of even moderate size, such an approach yields unacceptable performance. As a result, virtually all modern-day relational database systems employ B-Tree indexes or a variant.

General techniques for the construction and operation of B-Trees are well documented in the technical, trade, and patent literature. For a general description, see Sedgewick, R., *Algorithms in C*, Addison-Wesley, 1990. For a survey of various B-Tree implementations, see Comer, D., *The Ubiquitous B-Tree*, Computing Surveys, Vol. 11, No. 2, June 1979, pp. 121–137. For a description of B-Tree indexes implemented in a PC DBMS system, see Baker, M., *B-tree indexing: A look at indexing tradeoffs in dBASE, Clipper, and FoxPro*, Programmer's Journal, Vol. 8.6, November/December 1990, pp. 42–46. Also, see SYSTEM AND METHODS FOR INFORMATION RETRIEVAL, International Application No. PCT/US91/07260, International Publication No. WO 92/06440, Apr. 16, 1992, which describes B-Tree indexes for Fox® PC DBMS software. Multiple index files, including dBASE's .mdx files, have also been described in the technical literature; see e.g., Freeland, R., *Exploring MDXs*, Data Based Advisor, February 1991, pp. 85–87. The disclosures of each of the foregoing references are hereby incorporated by reference.

B. Conventional B-Tree maintenance

Maintenance of B-Trees is fundamental to the operation of indexes in a relational database system. As new data records are loaded in a database table, the index (and corresponding in-memory B-Tree) for that table grows, to accommodate the new records. As a new record is added to a table, a corresponding index entry (typically, index key value plus record identifier) is added to an appropriate slot in the appropriate B-Tree node (i.e., the node which is appropriate for the key value expressed by the record). Since each node of the B-Tree has a fixed size (generally, limited by the size of the database page employed), when an update operation occurs which exceeds the capacity of a particular node, an "overflow" condition exists at the node.

The conventional approach to handling node overflow is generally to split the particular node into equal parts—that is, "down the middle"—for storing the new information (i.e., for storing the additional key value/record identifier for the new data record which is being inserted). Instances where the data record to be inserted (i.e., "insert row") belongs at the end of a page (or node) are treated as a special case, however. In those instances, the conventional approach is to split the page at its end, rather than its middle; this optimizes sequential/batch loading of data which is in sorted order. For data insert operations which are random, the conventional approach yields good, if not optimal, results. As recognized by the present invention, however, data insert operations are often not entirely random. Moreover, a particularly common load pattern which emerges is the insertion of ascending records.

C. Loading data records into a table

How data records themselves are loaded depends on "where" in the table the records are to be logically located (i.e., by a index). This is dictated by the key value(s) expressed by each record. Perhaps the easiest scenario to consider is a table in which new records are always appended to the end of the table. Such a scenario occurs when the records to be inserted comprises records having key values greater than the key values of existing records in the table. Consider, for instance, an Invoice table which is ordered by Invoice No., the first field for the table. For maintaining the table (logical) order by Invoice No., an index exists on the Invoice No. field. If each new data record added to the table has an Invoice No. greater than that previously stored by the table, the new records will be appended to the end of the Invoice table. For example, if the table, before the insertion, has as its highest Invoice No. the value of 3,000, then in this scenario the next data record added would have an Invoice No. of 3,001 or greater. A data record storing an invoice number of, say, 2,000, would not be added.

In this example of always appending records to the end of a table, B-Tree maintenance is relatively simple. On the last insertion which overflows a node, the node is split into two nodes. All the data which was already stored on that node is kept with that node itself. The new data, however, is stored with the new node (i.e., placed on the new node which was split from the original node). Thus, on an insertion which overflows a node, the new data is simply stored on the new node which is started.

Records are not always simply appended to the end of a table, however. Instead, records may be inserted (logically) into the beginning, middle, or end of the table, or in an entirely random location of the table. Accordingly, node splitting in the manner just described for append operations (i.e., always create empty new nodes) would have suboptimal performance results if always applied for all load patterns: many more nodes would be created than needed. Recognizing this problem, researchers in the field have devised various indexing methodologies over time to accommodate the fact that newly added data records may be random in nature. Given record inserts which are entirely random, it has been observed that optimal or near-optimal performance is obtainable by the previously-described approach of splitting nodes in half: creating new left and right nodes from the previous node, with the right-half of the data being stored with the right node and the left-half of the data being stored with the left node. Conventional wisdom for B-Tree maintenance has been, therefore, to always split nodes which have overflowed exactly in half.

Optimizing B-Tree Maintenance

A. Recognizing particular load patterns

In practice, data records are often inserted into table locations which are not entirely random (and may in fact be quite non-random). Instead, particular "load patterns" emerge. "Load pattern," in this context, describes how the particular data records are added (logically) to the table. These load patterns influence how a B-Tree supporting an index for the table grows. A particularly common load pattern is the ascending insertion of data records into a table having a multi-column (composite) index. Such a table would include, for instance, a Sales table which had a Department No. field as its first column, an Employee No. field as its second column, and a multi-column index on the first two fields (i.e., a composite on Department No. plus Employee No.).

The high frequency of this pattern is, to some extent, a reflection of how business information is modeled in relational databases. Businesses are typically set up with a fixed number of branches or departments, with each branch or department being assigned a fixed number or ID (or at least a number or ID which changes very infrequently). Further, within each department, there generally exists a sequentially growing data set, such as a sequence of employee numbers, a sequence of customer numbers, a sequence of vendor numbers, a sequence of invoice numbers, a sequence of purchase orders, or the like. Despite the frequency of this particular load pattern, the conventional methodology of B-Tree maintenance adopts an approach which leads to unnecessary (i.e., half-empty) index pages being created.

B. Inefficiencies of conventional methodology: half-empty index pages

Applying conventional B-Tree maintenance methodology to an "ascending insert" load pattern is particularly wasteful. An ascending insert load operation generally results in new data records being added somewhere to the middle of the table, as opposed to a simple append operation which adds records to the end of the table. If the foregoing data load pattern is subjected to the traditional B-Tree maintenance methodology, almost every new page created (i.e., created by splitting an overflowed node in two) is half empty. Thus, the conventional approach to B-Tree maintenance in the common load scenario of "ascending inserts" leads to wasted space in the index, as half-empty index pages are unnecessarily created in the B-Tree being maintained.

Figure 3:
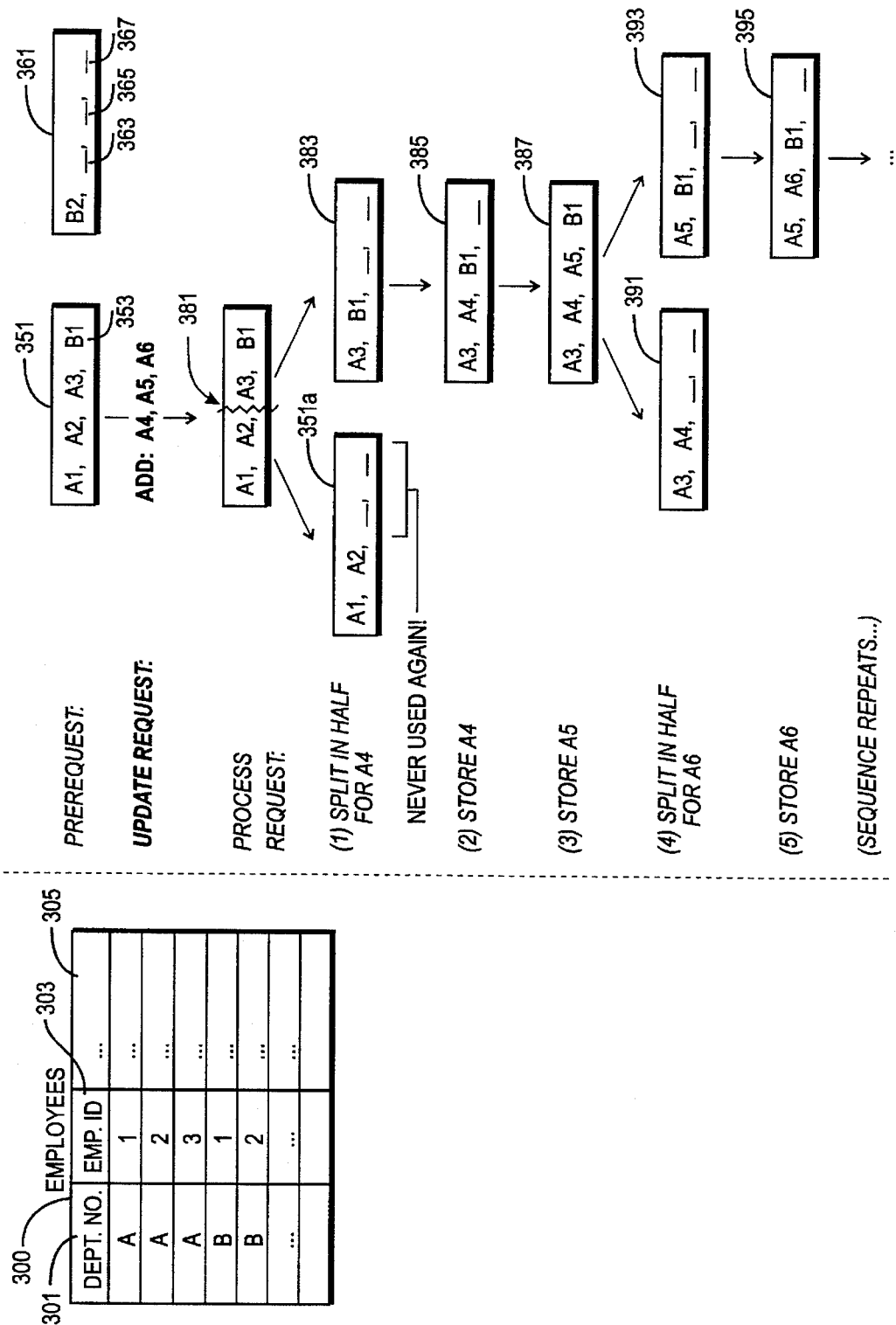
FIG. 3 is a block diagram illustrating creation of half-empty B-Tree nodes when nodes are split exactly in half, for ascending inserts.

FIG. 3 diagrammatically illustrates this problem. Consider a table having a multi-column index (e.g., a table having a composite primary key), such as the Employees table 300. As shown, the Employees table includes a first column or Department No. field 301. Appropriate departments, for this example of a fictitious firm, include Departments A, B, C, and so forth and so on. The table also stores an Employee ID field 303 storing an Employee ID or identifier for each employee in a given department. Here, appropriate ID values include 1, 2, 3, and so forth and so on. Thus, the column 303 stores Employee ID numbers by Department.

Initially (i.e., before the update of new records), the table 300 stores for Department A, the Employee ID's of 1, 2, and 3. For Department B, the table stores Employee ID's of 1 and 2. Other columns of the table (as indicated by one or more additional columns 305) store specific information for each employee record, such as employee name, employee's social security number, employee's manager, and the like.

For this example, assume an index configuration which can store key information for four records per leaf-level index node or page. For instance, node or page 351 stores information for the first four data records—that is, it stores key values of A1, A2, A3, and B1. Information for the fifth data record is stored in sibling node 361. As shown, the sibling node, at that particular instance, has three open slots 363, 365, 367.

Consider now a request 370 for inserting into the table records having the following key values: A4, A5, A6. Traditional methodology for processing these additional records proceeds as follows. The conventional method searches the B-Tree on the value of A4, whereupon it eventually locates node 351. More specifically, the conventional method notes that the key value of A4 is appropriately stored (i.e., in a sorted fashion) at slot 353 of node 351. However, the node 351 is already fully populated; no empty slots are available. Since there is no more space available in the node 351, the conventional method will proceed to split the node.

The conventional approach for splitting the node is to split it half way, as indicated at 381. Upon splitting, two nodes exist: a left node 351a (from original node 351) and a right node 383 (which is newly created). Since the node 351 was split in two, half of the prior key values are stored in the left node 351a (i.e., it stores key values of A1 and A2). The other half of the key values (i.e., key values of A3 and B1) are stored in the right node 383. Each node now contains two empty slots. Room now exists for storing the key value of A4. Specifically, it is stored in the right node 383 which, upon storage of A4, is transformed into the node 385 (since key values themselves are generally stored in a sorted fashion with a given node). Similarly, upon the arrival of A5, node 385 is transformed into node 387 which now stores key values of A3, A4, A5, and B1. At this point, therefore, node 387 is full.

Now observe the arrival of A6. This gives rise to a situation which is identical to that of storing A4 in node 351. Specifically, a conventional method would traverse the B-Tree for locating node 387 which is to store A6. Observing the node to be already full, conventional methodology would again undertaking the process of splitting the node. In the same manner as was done for node 351, the node 387 would be split in the middle. This yields left node 391 and right node 393. As before, the left node 391 stores two prior key values (i.e., A3 and A4) and two empty slots; also, the right node 393 stores two prior key values (i.e., A5 and B1) and two empty slots. Observe, therefore, that the transition from node 351 to nodes 351a and 383 has just been repeated by the transition of node 387 into node 391 and 393. With an ascending insert data load operation, this pattern continues to repeat. Since the "ascending insert" data load operation is driven by the minor index of a multi-column (composite) index (i.e., for an ascending insert to somewhere in the middle of the table), the end result is that the newly created nodes of the index are half empty.

C. Exacerbation by clustered indexes

The foregoing problem is further exacerbated by "clustered" indexes. A clustered index is one in which the data of the table are put directly on the leaf-level nodes of the B-Tree. This is in contrast to a conventional B-Tree in which the leaf nodes stores only pointers to the actual data pages (which, because of their large size, are generally loaded as a heap, as needed). Present-day examples of systems employing clustered indexes include, for instance, Paradox® from Borland International of Scotts Valley, Calif., Sybase SQL Server™ from Sybase of Emeryville, Calif., and Microsoft® SQL Server from Microsoft of Redmond, Wash. The above-described penalty incurred with half-empty nodes is even more pronounced for clustered-index database systems because those systems incur, in addition to half-empty index nodes, half-empty data pages. The half-empty data pages, because they store actual data records, are typically large. Consider, for instance, a table having a clustered index which receives an ascending insert update of 100 megabytes (i.e., 100 megabytes of actual user data). Such a table, employing conventional methodology, would generally require 200 megabytes of storage space, just to store the 100 megabytes of new user data (since the new data pages are half-empty). Besides the added disk storage, the half-empty data pages also consume system memory and related resources (when processing the B-Tree). Further, the methodology consume precious CPU cycles for unnecessary splitting. Because the problem of half-empty pages is exacerbated in systems employing "clustered" indexes (e.g., Sybase SQL Server™), benefits of the present invention are especially pronounced in such systems.

D. Characteristics of ascending inserts records

According to the present invention, B-Tree maintenance is optimized for the common load pattern of an ascending insert operation, particularly for tables having composite (multi-column) indexes. To understand how the maintenance may be optimized, it is helpful to first study particular properties of data records themselves for such a load pattern. Again considering the abovementioned Sales table, note that the first column is a fixed entity, for purposes of the load operation. For example, when loading an update from the abovementioned Sales table, the Department No. field is fixed to the value of a particular department. Here, the field is fixed to the value of the particular department which is forwarding its records to be loaded into a master table. Examples include "West Coast Sales" department which is transmitting its sales information to a computer database resident at the company's headquarters.

The last column generally comprises an entity which continually increases, monotonically, in the context of the first column. In each department, for instance, this column may store accumulated sales for that department, or a sequence of employee numbers, or a sequence of purchase orders, or any other monotonically increasing value. For the Sales department, the second column may comprise an Invoice No. field, storing a sequence of invoice numbers, such as "1001", "1002", "1003", and so forth.

E. Preferred method for processing ascending inserts

When a request from a client to insert a new row (i.e., record) into the table occurs in the system of the present invention, the Access Methods 241 employ the index 245 for determining on which of the leaf-level pages the particular row should be inserted. If sufficient space exists on the particular page located, then the Access Methods do not require the assistance of the Page Manager. The row is simply inserted into the located page, at the appropriate storage space or "slot" available at that page. The process may continue in this manner until a row arrives for insertion which cannot fit on the existing page.

Upon the arrival of a row which cannot fit on the existing page, the Access Methods perform two tasks. First, the Access Methods decide where to split the page—that is, how to divide the contents of the existing page into two different pages. Second, the Access Methods seek assistance from the Page Manager for allocating a new page (which is now needed, at this point, for the table). It is, therefore, up to the Access Methods 241 to decide how to divide the data (i.e., the data existing on the old page and the data coming in from the new row) among the two pages which are now made available. As the client continues to add more and more rows, the table continues to grow and the process repeats. This operation occurs very frequently in practically all on-line transaction processing (OLTP) systems.

In the instance where a client submits a pattern of data records to be inserted which comprises an ascending insert of records having a multi-column index, the Access Methods 241 detect on-the-fly that the data records are being inserted in ascending order and undertakes steps to prevent the creation of half-empty pages which are observed in prior art systems. In operation, the Access Methods typically receive from the Clients a plurality of insert requests, one-by-one. If the Access Methods could look into the future or remember the past, they could more easily detect the pattern of ascending inserts (and, thereby, avoid half-empty pages). One approach would be to have the Access Methods, applying heuristic techniques, "remember" what the previous request from a client is. Although plausible, that approach is not ideal with existing processing hardware, however.

The Access Methods typically function at the core level of the Database Server System. They form a critical path in the moment-to-moment operation of the Database Server System. It is, therefore, generally not feasible (or at least undesirable) to burden the Access Methods with the additional task of monitoring historical trends in incoming data. In other words, the Access Methods do not "have the time" to perform look ups, patterns recognition, and the like, on incoming data—at least not without significantly impacting the performance of the Database Server. Accordingly, any changes to the Access Methods 241 must be made in a manner which would not otherwise impair the performance of the Database Server System 240.

According to the present invention, the Access Methods 241 are modified as follows. The Access Methods 241, sometimes, split the page not at the half-way point but, instead, exactly at the point of insertion—where the new row would have gone into the page. This is perhaps best illustrated diagrammatically.

Figure 4:
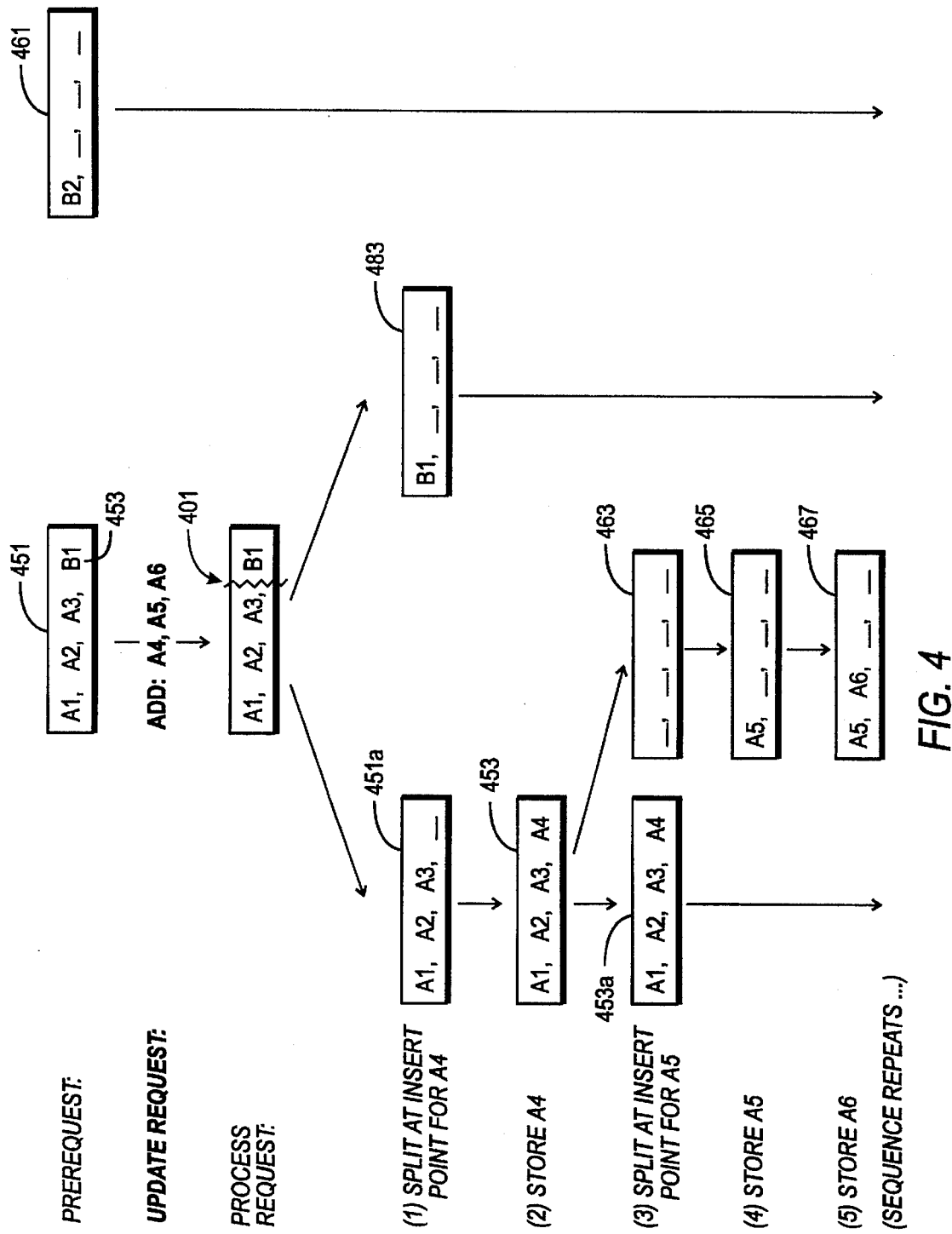
FIG. 4 is a block diagram illustrating a preferred method of the present invention for splitting B-Tree nodes, at insertion points, for an ascending insert load pattern.

Recall the example of FIG. 3, where nodes or pages were split exactly in two. There, a B-Tree having B-Tree node 351 (storing A1, A2, A3, and B1) and B-Tree node 361 (storing B2) received an update request to insert values of A4, A5, and A6. FIG. 4 details the splitting of pages performed in accordance with the present invention. Nodes 451 and 461 of FIG. 4 correspond to nodes 351 and 361 of FIG. 3, respectively. As shown in the FIG. 4, as A4 arrives, if certain conditions are met (described below), the Access Methods will split the page at the insertion point, i.e., between A3 and B1 (shown at 401). This leads to the creation of the following two nodes: Node 451a which stores A1, A2, and A3 and Node 483 which stores B1. In other words, the Access Methods decide to split the page between A3 and B1 (i.e., the insertion point for A4), instead of splitting the node between A2 and A3. The storage of A4 is shown at 453.

The arrival of A5 at node 453 leads to an overflow state, as the node 453 cannot accommodate the new value. This leads to a split at the point of insertion, leading to node 453a (storing A1, A2, A3 and A4) and empty node 463. The newly created node 463 is, in turn, used to store A5, as shown at 465. The node 465 may, in turn, store arriving values of A6, A7, and A8. The storage of A6 in the node, for instance, is shown at 467. Upon the arrival of A9, another page split occurs (not shown in FIG. 4), with the result that A9 is stored in the newly-created page. At this point, therefore, a sequence has developed where successive values of an ascending insert are sequentially stored in a series of newly-created nodes or pages. Observe node 483, which is the second node created from the split of 451. Although that particular node does contain empty space, that additional space is a one-time cost. Every other page created during the ascending insert will be completely full (up to the final key value added).

Figure 5:
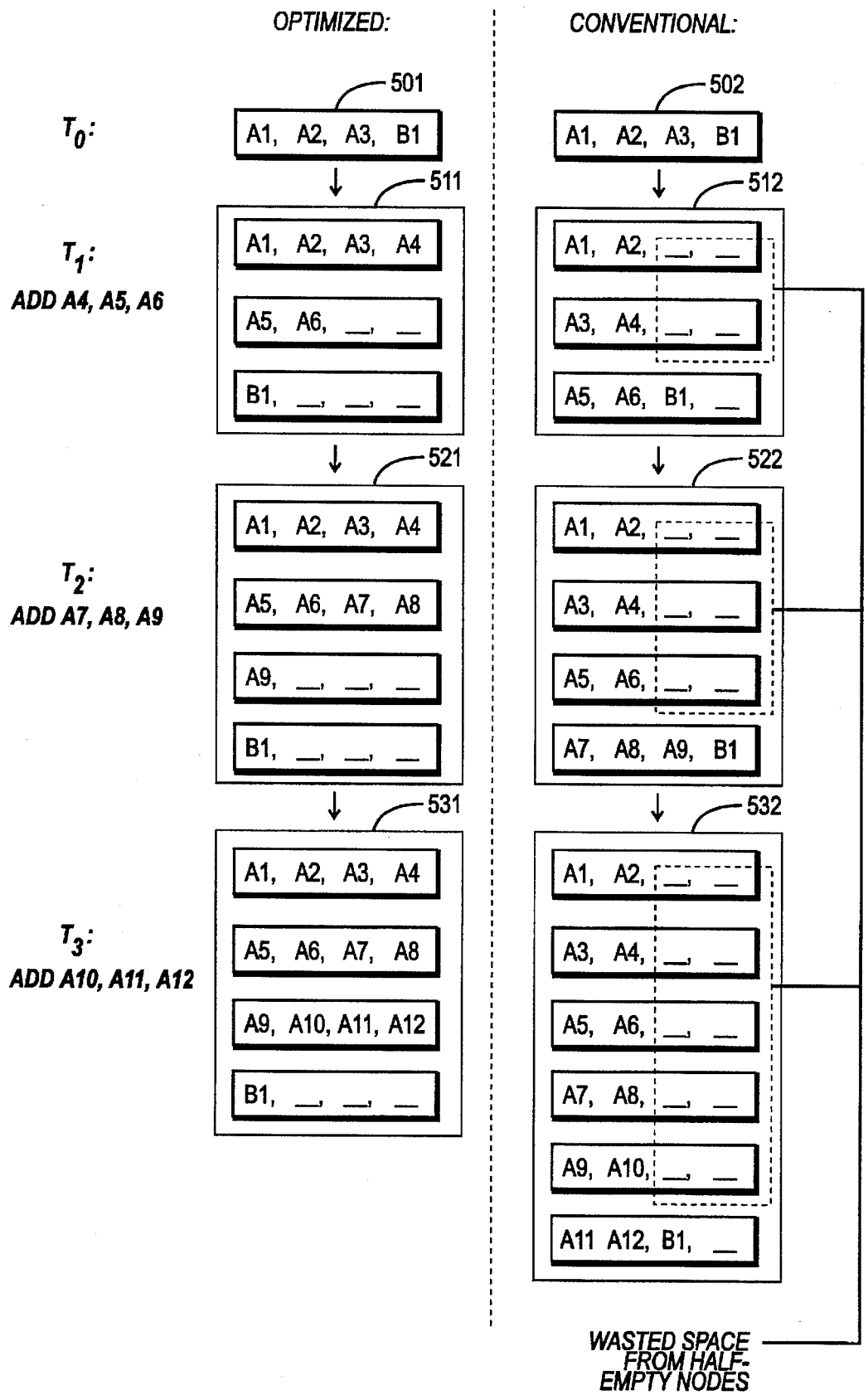
FIG. 5 is a block diagram illustrating node usage for the approach of FIG. 4, as compared against the approach of FIG. 3.

FIG. 5 provides a side-by-side comparison of the optimized method of the present invention with the previously-described conventional approach. Nodes 501 and 502, shown at time $T_0$, comprise the same node as node 451 in FIG. 4 (and node 351 in FIG. 3). At time $T_1$, the values of A4, A5, and A6 are added. The result of sequentially splitting node 501, in accordance with the present invention, is shown at 511. In a corresponding manner, the nodes created by successively splitting node 502, according to conventional methodology, is shown at 512. As is readily apparent, half-empty nodes are already beginning to develop at 512. Continuing on to time $T_2$, the descendants of node 501 have been further split, as shown at 521, to accommodate new values of A7, A8, and A9. Again, a comparison of corresponding nodes which are maintained with conventional methodology is shown at 522. In particular at this point, it is evident that the nodes at 522 include three half-empty nodes. Still, at this point, there are equal number of nodes between the two techniques: each approach has led to the creation of four nodes. At time $T_3$, the apparent "parity" between the two techniques is short lived. In particular, the conventional methodology now, at this point, has led to the creation of six nodes, five of which are half-empty (as shown at 532). The optimized method of the present invention, on the other hand, has only led to the creation of four nodes at this point, as shown at 531.

With the addition of just nine additional records, the disparity between the two methodologies is apparent. More particularly, SQL database systems will generally entail record updates on the order of thousands or even millions of records. In practice, therefore, the method of the present invention leads to substantially less requirement of precious system resources (e.g., system memory and disk storage space). Moreover, the approach further enhances system performance by reducing the number of node splits (and associated system overhead associated with invoking routines for node splitting).

F. Avoiding suboptimal insertion-point page splitting

In a preferred embodiment, the access methods do not split pages at the insertion point at all times. To do so would lead to pronounced suboptimal performance. Recall that for an entirely random data set, optimal or near-optimal performance is realized by splitting the nodes down the middle. In the case where insertions are completely at random, therefore, splitting at the insertion point would lead to a regression in performance.

Accordingly, in a preferred embodiment, the following (optional) conditions should preferably exist before the Access Methods proceed to split pages at insertion points (rather than mid points). First, the table should be in "ascending insert" mode. It is an option in Sybase SQL Server, as in other systems, to specify a particular access mode for a table. In a preferred embodiment, the database server includes a user command for setting an "ascending insert" mode. This may be accomplished, for instance, as an extension to the SQL commands supported by the Database Server. In a preferred embodiment, therefore, clients are provided with the explicit ability to set tables to "ascending insert" mode. This recognizes that clients are generally in a better position to know or to ascertain the characteristics of data which they are to insert, such as whether the group of data records to insert is a candidate for ascending insert. In this manner, the Database Server need not derive knowledge about the data which is already known to the Client.

The second (optional) condition is that the index (or indexes) to be maintained is a multi-column index. The reason for this is as follows. If the table is indexed or keyed on a single column, it will generally not be the case that a gap exists between two sequential values which is about to be filled up (i.e., updated) sequentially.

The third (optional) condition is to check that the insert is actually sequential. In other words, each new row should agree with the immediately preceding row on all but the last column of the index. As shown in the example in FIG. 4, for instance, for the values of A4, A5, and A6, the first column (i.e., the one storing A) remains constant for all records. Further, the second column (i.e., minor index) is sequentially increasing (i.e., from one to two to three, and so forth and so on). If this third condition is not met, then the system should have some doubt as to whether the insertion is sequential in nature.

The fourth condition is that the ascending insert scenario is occurring with a probability greater than a given value (i.e., threshold). Reconsider the ascending sequence of A3, A4, A5, and so forth and so on. For such a sequence, the correct decision is to split the pages at the point of insertion. Consider, however, a scenario where the Access Methods initially make the wrong decision (i.e., split at midpoint), followed by then making the right decision (i.e., splitting at the insertion point). Once the Access Methods have performed the split at the insertion point, the B-Tree maintenance reverts back to the optimal state (of avoiding the creation of half-empty nodes). From this point on, therefore, the conventional approach of B-Tree maintenance works well. The fourth condition takes into consideration, therefore, that the splitting of pages at the insertion point needs only to happen once for each ascending insert sequence. In other words, the nodes need not be split at the insertion point all the time for such a sequence. Instead, benefits will be realized if insertion-point splitting occurs with some degree of probability. The threshold or degree of probability may be selected empirically, for fine-tuning B-Tree maintenance.

The foregoing conditions, although not mandatory for operation of the method of the present invention, nevertheless identify scenarios where application of the method of the present invention might lead to suboptimal performance. Hence in a preferred embodiment, these conditions are desired before proceeding with insertion-point splitting of nodes.

Internal operation

Figure 6:
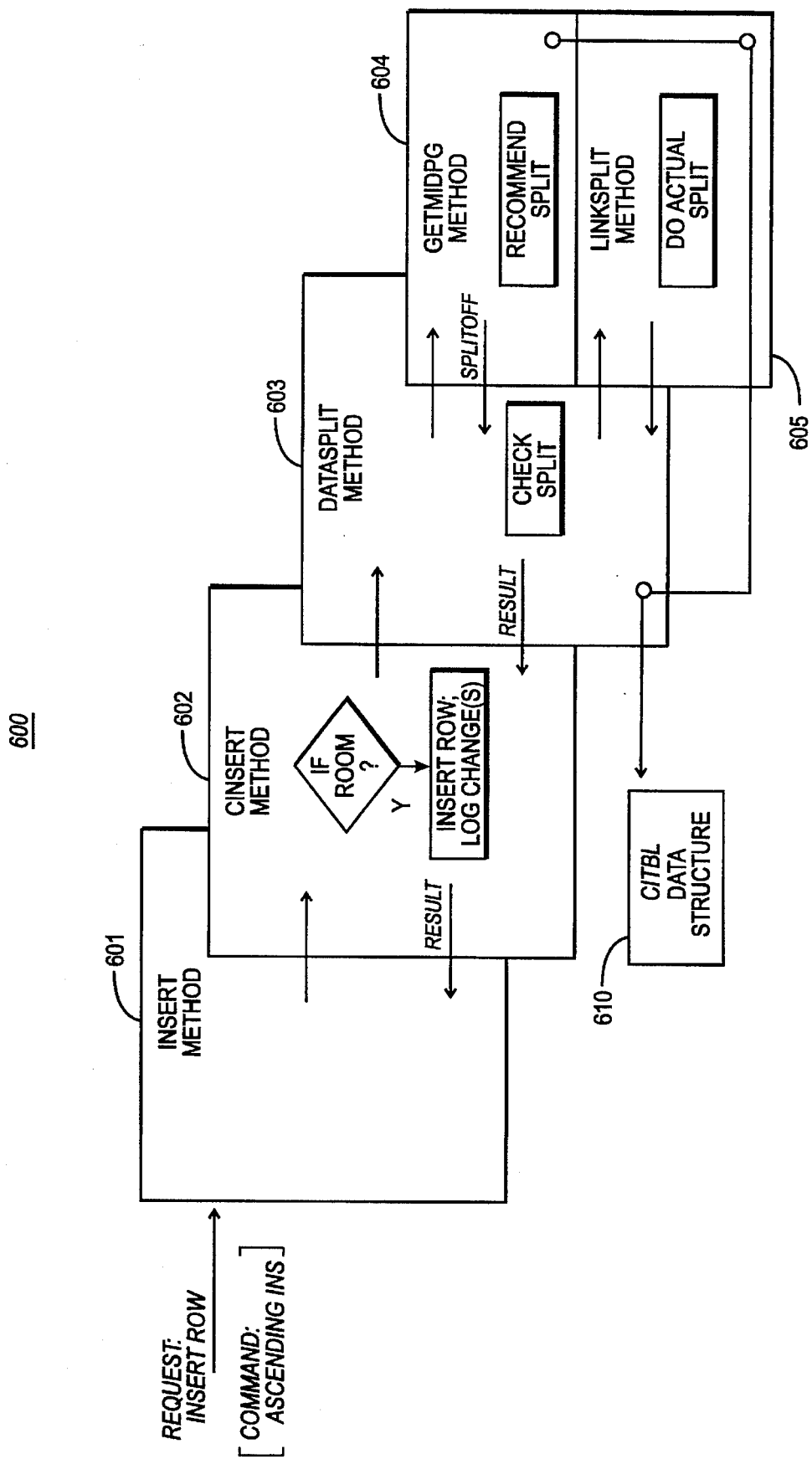
FIG. 6 is a block diagram illustrating a sequence of methods of the present invention for optimizing B-Tree maintenance.

FIG. 6 illustrates an overall method of the present invention for inserting a row (data record) into a table. The high-level method 600, which in turn comprises specialized submethods, proceeds as follows. First, an insert method 601 is invoked for inserting a new row into the table. In particular, the method is invoked with a request to insert a particular row and with a description of the session which characterizes the context of the insert. The particular row of interest is indicated by passing to the method a pointer to the row to insert (i.e., where it is currently stored in system memory) and a length (size) of the row to insert. The session is indicated by passing a session descriptor (sdes) which describes information about the user session which has led to the activation of the insert method. The session descriptor stores essentially all information relevant to the current session, either directly (i.e., stored within the data structure itself) or indirectly (i.e., via pointers stored within the sdes structure). The session descriptor stores, for instance, information about the table, including a table descriptor and a table handle. The session descriptor also includes, for example, information about access rights to a particular table.

The insert method in turn calls, for an exemplary embodiment employing clustered indexes, a cinsert method 602. The cinsert method includes overhead processing for avoiding deadlocks. Ultimately, the method traverses the B-Tree for reaching the particular data page of interest (i.e., the one which is to store the incoming row). The cinsert method determines whether sufficient room exists on the data page which has been located. If sufficient room does exist (i.e., an open slot is found), then the method can simply proceed to insert the row, log the change, and then simply return.

Often, however, sufficient room does not exist on the data page. In such an instance, the method 600 proceeds to invoke a datasplit method 603 for splitting the data page. In other words, the datasplit method is invoked when an insert is required to a page which has insufficient room to hold the insert row. In an exemplary embodiment, the datasplit method may be constructed as a function or routine in the C programming language (which is well documented in the technical, trade, and patent literature) as follows:

```
 1:  int
 2:  datasplit(CINSTABLE * citbl)
 3:  {
 4:      REGISTER PAGE   *pgptr;         /* ptr to page to split */
 5:      int             savepfreeoff;   /* storage for pfreeoff */
 6:      REGISTER SDES   *sdes;          /* local sdes */
 7:      REGISTER BUF    *bp;            /* local bp */
 8:      REGISTER BUF    *parent;        /* local parent */
 9:      int             error;          /* error indicator */
10:      int             lockstat;       /* status of lock acquisition
```

22
11:                  ** by lock_neighbors.
12:
13:     /* set locals */
14:     sdes     = citbl->sdes;
15:     bp       = citbl->bp;
16:     parent   = citbl->parent;
17:     pgptr    = bp->bpage;
18:
19:
20:     /*
21:     ** Try to lock pnextpg of bp, and avoid getting a deadlock.
22:     ** In the case of duplicate keys and overflow pages, we actually
23:     ** may end up locking another page, but this lock request is made
24:     ** here to take care of the situations where we don't call insnewpg().
25:     ** Note: Access to overflow pages can only be made if one has the
26:     ** first data page in the overflow chain locked.
27:     ** (in this case they would have to have a lock on bp).
28:     */
29:     lockstat = lock_neighbors(sdes, pgptr, &citbl->parent, LOCK_NEXTPG,
30:                   DONT_LOCK_PREVPG);
31:
32:     /* Check for deadlocks, and raise an error if got a deadlock*/
33:     if (!lockstat)
34:         return -EX_NUMBER(INSRTM, IDEADLOCK);
35:
36:     /* if insert row is dupkey case, go to dupkey handler */
37:     if (citbl->sdes->sstat & SS_DUPKEY)
38:         return insdupkey(citbl);
39:
40:     /*
41:     **  We must first check possible connected or disconnected
42:     **   overflow pgs to see if there is room there for the
43:     **   insert. If not, a new pg must be allocated - in any case
44:     **   we take this opportunity to convert disconnected over-
45:     **   flow pages into real ones. The use of overflow pages
46:     **   is only relevant if we are adding to the end of the pg.
47:     */
48:
49:     if ((pgptr->pstat & PG_HASOVER) && (pgptr->pfreeoff == citbl->offset))
50:     {
51:         // ....
52:     }
53:     else
54:     {
55:         /* no overflow pgs, no room on page, not a dupkey */
56:         /*
57:         ** if adding to end of page then go to special case where
58:         **  we create new page and insert at beginning of that
59:         **  page
60:         */
61:
```

```
 62:        if ((pgptr->pstat & PG_ADDEND) && (pgptr->pfreeoff ==
 63:            citbl->offset))
 64:        {
 65:            /* guaranteed to have no overflow pgs here */
 66:
 67:            /* split at end of pg - move no rows to new pg */
 68:            citbl->splitoff = pgptr->pfreeoff;
 69:
 70:            /* insert at beginning of new page */
 71:            citbl->offset  = PAGEHEADSIZE;
 72:            SETSTAT(citbl, pgptr);
 73:
 74:            /* create new page and insert row there */
 75:            return insnewpg(citbl);
 76:        }
 77:
 78:        /*
 79:        ** Determine offset nearest middle of page not in midst of
 80:        **   a dupkey group.
 81:        */
 82:
 83:        getmidpg(citbl);
 84:
 85:        /*
 86:        ** If splitoff is at end of pg, treat as if ADDEND were set
 87:        */
 88:
 89:        if (citbl->splitoff == pgptr->pfreeoff)
 90:        {
 91:            /* insert at beginning of new page */
 92:            citbl->offset  = PAGEHEADSIZE;
 93:            SETSTAT(citbl, pgptr);
 94:
 95:            /* create new page and insert row there */
 96:            return insnewpg(citbl);
 97:        }
 98:
 99:        /* keep track of original freeoff value */
100:        savepfreeoff = pgptr->pfreeoff;
101:
102:        /*
103:        ** Determine if room on either newly created page or the old
104:        **   page for the insert row if we split at splitoff. If so, do
105:        **   that split and insert row. If this will not work, see if
106:        **   splitting at offset of insert would create
107:        **   enough room on the page for the insert. If this fails then
108:        **   we must allocate a third page, perform the last split
109:        **   described and put the insert row on the third
110:        **   page which gets linked in between the other two.
111:        */
112:
```

```
113:    /*
114:    **  If insert is to go before mid point of page...
115:    */
116:
117:    if (citbl->offset <= citbl->splitoff)
118:    {
119:       /*
120:       **  See if there will be room for the new row if we
121:       **   were to move rows past the midpage point off
122:       **   to a new page
123:       */
124:
125:       pgptr->pfreeoff = citbl->splitoff;
126:       if (space_left(citbl->bp) >= citbl->rlen)
127:       {
128:          /*
129:          **  there is room on the old page if we move
130:          **   rows off at mid pg point
131:          */
132:
133:          pgptr->pfreeoff = savepfreeoff;
134:          SETSTAT(citbl, pgptr);
135:          if ((error = linksplit(citbl)) != 0)
136:             return error;
137:
138:          /* put data on old page */
139:          goto insert_old;
140:       }
141:    }
142:    else
143:    {
144:       /*
145:       ** Insert intended for after midpg point. We will see
146:       **  if room exists on the new pg if we move rows from
147:       **  midpg point of old page to a new one. First calc
148:       **  what pfreeoff would be on such a new page. Then
149:       **  make the check for space.
150:       */
151:
152:       pgptr->pfreeoff = savepfreeoff - citbl->splitoff +
153:          PAGEHEADSIZE;
154:       if (space_left(citbl->bp) >= citbl->rlen)
155:       {
156:          /*
157:          **  Room on new page with rows from old page
158:          **   past midpoint of old page. Restore real
159:          **   pfreeoff and calculate new insert offset
160:          **   on new page.
161:          */
162:
163:          pgptr->pfreeoff = savepfreeoff;
```

```
164:            citbl->offset = (citbl->offset -
165:                citbl->splitoff) + PAGEHEADSIZE;
166:
167:            /* insert row on new page */
168:            SETSTAT(citbl, pgptr);
169:            return insnewpg(citbl);
170:        }
171:    }
172:
173:    /* insert row won't fit on either page at splitoff point */
174:    pgptr->pfreeoff = savepfreeoff;
175:
176:    /*
177:    ** If adding row to end of page, add a new page and put
178:    ** the row there
179:    */
180:    if (citbl->offset == pgptr->pfreeoff)
181:    {
182:        /* split at end of pg - move no rows to new pg */
183:        citbl->splitoff = pgptr->pfreeoff;
184:
185:        /* insert at beginning of new page */
186:        citbl->offset  = PAGEHEADSIZE;
187:        SETSTAT(citbl, pgptr);
188:
189:        /* create new page and insert row there */
190:        return insnewpg(citbl);
191:    }
192:
193:
194:    /*
195:    ** If not adding to end of page, allocate new pg
196:    ** and move rows from insert point to new pg
197:    */
198:
199:    SETSTAT(citbl, pgptr);
200:    citbl->splitoff = citbl->offset;
201:    if ((error = linksplit(citbl)) != 0)
202:        return error;
203:
204:    /*
205:    ** If insert point for new row is at head of old page then that
206:    ** page is currently empty (pfreeoff = PAGEHEADSIZE) so we
207:    ** cannot split it at pfreeoff and add the row to the
208:    ** new page since that would leave the old page empty. Instead
209:    ** we split it at the insert point and insert the new row
210:    ** on the old page.
211:    */
212:
213:    if (citbl->splitoff == PAGEHEADSIZE)
214:        goto insert_old;
```

```
215:
216:        /* add new parent entry */
217:        if ((error = makecindexentry(citbl)) != 0)
218:           return error;
219:        bufunkeep(citbl->newb, citbl->sdes);
220:
221:        citbl->splitoff = pgptr->pfreeoff;
222:        citbl->offset = PAGEHEADSIZE;
223:        SETSTAT(citbl, pgptr);
224:
225:        return insnewpg(citbl);
226:     }
227:
228:     /*
229:     ** We reach this target when putting the new row on the old page.
230:     */
231: insert_old:
232:     /* Insert the row, then make an index entry. */
233:     if (((error = insdata(citbl)) == 0) &&
234:         ((error = makecindexentry(citbl)) == 0))
235:     {
236:        /* clean up new pg buffer and parent buffer */
237:        bufunkeep(citbl->newb, citbl->sdes);
238:        freeparent(citbl);
239:     }
240:     return error;
241: }
```

(line numbers added for clarity of following description)

As shown, the datasplit method is invoked with a pointer to a clustered-index insert table data structure 610, citbl, which stores information necessary for effecting the insert. In an exemplary embodiment, the data structure may be constructed as follows (again using the C programming language):

```
typedef struct cinstable
{
    SDES      *sdes;
    BUF       *parent;
    BUF       *orig;
    BUF       *bp;
    BUF       *ovbp;
    BUF       *newb;
    BYTE      *rp;
    RID       *ridp;
    INDEX     *indptr;
    int       rlen;
    int       offset;
    int       splitoff;
    short     pstat;
} CINSTABLE;
```

During the process of inspecting the data page for determining whether room exists for an insert, the cinsert method discovers relevant information about the table. This information is, in turn, stored in the insert table data structure (citbl), so that the datasplit method (and its dependent methods) need not re-discover the information.

As shown, the insert table data structure comprises the following members:

| | | |
|---|---|---|
| (1) *sdes: | pointer to session descriptor | |
| (2) *parent: | pointer to parent page buffer (header); this is the page or node which is to be split | |
| (3) *orig: | pointer to original target buffer pointer | |
| (4) *bp: | pointer to target insert page buffer (header) | |
| (5) *ovbp: | pointer to overflow pg page buffer (header) | |
| (6) *newb: | pointer to newly allocated page buffer (header) | |
| (7) *rp: | pointer to insert row | |
| (8) *ridp: | pointer to RID (Record ID) structure of insert | |
| (9) *indptr: | pointer to INDEX for this table and insert | |
| (10) rlen: | length of insert row | |
| (11) offset: | offset of insert on page | |
| (12) splitoff: | offset of split point on page | |
| (13) pstat: | status word to plant on new page | |

As shown by the above data structure, the datasplit method is passed an offset to where the insert is to go if enough room exists on the page (i.e., the insertion point). In turn, the method establishes a splitoff—that is, where the page is to be split. The knowledge known to the datasplit method at this point, therefore, may be summarized as follows. The method knows the current session context, from the session descriptor. It also knows about the parent page, from the pointer to the parent page buffer. Within that buffer, the method knows the offset (i.e., insertion point) at which the row would have gone (if sufficient room had existed). Furthermore, it knows about the row itself, from the pointer to the insert row (*rp) and length of insert row (rlen). With this information, the datasplit method can determine where the page is to be actually split, the splitoff. With this information, the method can carry out the steps necessary for effecting the split. Upon completion of this task, the method returns a result code, for indicating whether the task has been successfully completed.

The specific steps of the datasplit method are as follows. At the outset, the method declares local variables at lines 4–10. Generally, these variables function to store local copies of data members which have been passed in (via citbl), or store housekeeping information (e.g., such as an error indicator). At lines 13–17, the local variables are initialized to the corresponding data members which have been passed in. After initializing local variables, the method proceeds to lock the next page in the page chain—the chain or list of successive data pages. At this point, therefore, it is desirable to not allow another user process to access the next page in the page chain, as that page stores a pointer to the current page (i.e., the page which the datasplit method is operating on). In order to avoid a deadlock situation, therefore, the neighboring page is locked (lines 20–34) before the current page is split.

Next, the datasplit method proceeds to check for duplicate keys. In an preferred embodiment which includes Sybase SQL Server™ as the Database Server 240, the insertion of duplicate keys is handled as a special case. In the instance of inserting a duplicate key, the Database Server creates an overflow page for storing the row having the duplicate key. This is performed at lines 36–38, which include a call to an insdupkey method (i.e., for inserting the duplicate key). Since further page splitting is not required, the call to insdupkey is followed by a "return."

At lines 40–52, the datasplit method checks for the possibility of connected or disconnected overflow pages, to determine whether room exists there for the insert. Overflow pages represent an implementation-specific detail of SQL Server and are not particularly relevant to splitting pages in accordance with the present invention. The method otherwise proceeds past line 52 (i.e., to the "else" statement of line 53).

At lines 62–63, the datasplit method checks whether the row which is about to be inserted goes (already) to the end of the page. In such a case (yes at lines 62–63), the datasplit routine simply creates a new page and attaches it to the end of the current page (lines 64–76), thereby avoiding any complex data splitting steps. The row can then be inserting into the newly-created page, as shown at lines 74–75. When the insert row points to the end of the page, the offset data member will be equal to freeoff—a data member which points to the end of the page.

If the row to be inserted is not positioned at the end of the page, however, the row is to be inserted somewhere in the middle of the page. Therefore, the datasplit method proceeds to lines 78–83, for determining the appropriate offset nearest the middle of the page (and not in the midst of a duplicate key group, as described above). At this point, the datasplit method calls a "Get Mid Page" method 604, getmidpg. As shown, this submethod or subroutine is passed (e.g., via a pointer) the corresponding insert table information which the datasplit method itself was invoked with. Accordingly, the subroutine already knows about the identity of the row itself, what the corresponding buffer is, and where that row would have gone in the buffer (had room existed). Given this information (from citbl), the getmidpg subroutine sets the value of splitoff (which itself is stored within citbl). In other words, given a particular row and a particular page in which to insert that row, the subroutine returns a recommendation of where to split the page (by setting the value of splitoff in the citbl data structure).

In an exemplary embodiment, the method may be constructed as follows (again shown in the C programming language):

1: /*

```
 2: **    GETMIDPG()
 3: **
 4: **    getmidpg(citbl)
 5: **
 6: **    This routine calculates the point nearest the middle
 7: **    of rows on a page which is not in the middle of a dupkey group.
 8: **    It is optimized for unique indexes.
 9: **    It is also optimized for non-unique indexes in that it assumes
10: **    that the midpoint of the pg is not within a dupkey group.
11: **
12: **    Parameters:
13: **
14: **         citbl  --  ptr to clustered index insert table structure
15: **
16: **    Returns:
17: **
18: **         none
19: **
20: **    Side Effects:
21: **
22: **         -- citbl->splitoff gets mid page offset
23: **
24: */
25:
26: void
27: getmidpg(CINSTABLE * citbl)
28: {
29:
30:    REGISTER BYTE *mid;         /* middle of rows on page */
31:    REGISTER BYTE *rp;          /* working row ptr */
32:    REGISTER BYTE *before;      /* last working row ptr value */
33:    REGISTER PAGE *pgptr;       /* ptr to target page header */
34:    int        dupsize;    /* size duplicate key group */
35:    int        off;        /* offset of row to qual */
36:
37:    /*
38:    ** We need to decide where to split the page. The following
39:    ** pseudo code illustrates the available choices.
40:    **
41:    **    if (row is to be inserted at end of page) {
42:    **       create a new (empty) page
43:    **       insert row on new page
44:    **    }
45:    **    else if (table is in ascinserts mode) {
46:    **       split current page at the point of insertion
47:    **       insert row on old page
48:    **    }
49:    **    else { (* default mode *)
50:    **       split current page in halves
51:    **       insert row on appropriate page
52:    **    }
```

```
 53:    **
 54:    ** In default configuration, SQL Server is optimized for two types
 55:    ** of inserts to tables: random, and appends to end of table.  A
 56:    ** table can be put in the ascinserts mode by the dbcc command
 57:    ** dbcc tune(ascinserts, [0|1], <tablename>)
 58:    **
 59:    ** The reason to split at insert point rather than at midgape is
 60:    ** best illustrated by the following example.
 61:    **
 62:    ** Suppose table sales has a clustered index sales(shop#, time).
 63:    ** There are three shops (A,B,C), each of which keeps adding sales
 64:    ** records in chronological order. We use integers to denote time.
 65:    ** Suppose the table contains rows (A1,A2,A3,B1,B2,C1,C2,C3), each
 66:    ** page holds 4 rows, and we insert rows (A4,A5,A6, ...).
 67:    ** Default mode yields:
 68:    ** <A1,A2,A3,B1>  <B2,C1,C2,C3>
 69:    ** <A1,A2, _, _>  <A3,A4,B1, _>  <B2,C1,C2,C3>
 70:    ** <A1,A2, _, _>  <A3,A4,A5,B1>  <B2,C1,C2,C3>
 71:    ** <A1,A2, _, _>  <A3,A4, _, _>  <A5,A6,B1, _>  <B2,C1,C2,C3>
 72:    ** <A1,A2, _, _>  <A3,A4, _, _>  <A5,A6,A7,B1>  <B2,C1,C2,C3>
 73:    ** <A1,A2, _, _>  <A3,A4, _, _>  <A5,A6, _, _>  <A7,A8,B1, _>  <B2,C1,C2,C3>
 74:    **
 75:    ** That is, all new pages are half empty.
 76:    ** However, when the table is in ascinserts mode, we get:
 77:    **
 78:    ** <A1,A2,A3,B1>  <B2,C1,C2,C3>
 79:    ** <A1,A2,A3,A3>  <A5, _, _, _>  <B1, _, _, _>, <B2,C1,C2,C3>
 80:    ** <A1,A2,A3,A3>  <A5,A6,A7,A8>  <B1, _, _, _>, <B2,C1,C2,C3>
 81:    ** i.e., all pages except for first page for each shop are full.
 82:    **
 83:    ** Obvious query: If the ascinserts mode works so well, then why
 84:    ** not make it the default mode? The not so obvious answer is that
 85:    ** for random inserts, splitting at mid page is our best option.
 86:    **
 87:    **
 88:    **
 89:    ** The above requires the user to choose between the
 90:    ** default mode and ascinserts mode. As pointed out earlier, the
 91:    ** ascinserts mode is suboptimal for random inserts.  Here is an
 92:    ** improvement that may maintain good performance for random
 93:    ** inserts even when the table is in ascinserts mode:
 94:    ** Splits pages at insert point rather than at mid page only when
 95:    ** all of the following three conditions are met:
 96:    ** 1) table is in ascinserts mode
 97:    ** 2) the clustered index has at least two columns
 98:    ** 3) the new row matches the row immediately preceding it in all
 99:    **    columns of the clustered index except the last column.
100:    ** Current implementation checks only the first.  The idea is that
101:    ** the second and third cond. will not hold for random inserts.
102:    ** This will improve the efficiency of random inserts to tables in
103:    ** ascinserts mode. However, we still will not be able to make
```

32

```
104:    ** the ascinserts mode the default (i.e., get rid of the first
105:    ** condition), since the second and third conditions will be true
106:    ** for some random inserts.  To see that, consider random inserts
107:    ** to a two column clustered index where the first column has
108:    ** very poor selectivity.
109:    ** For example: employee(gender, ssn).
110:    */
111:
112:    /* calculate middle of rows on page */
113:    pgptr = citbl->bp->bpage;    // get ptr to page
114:    if (citbl->indptr->indstatus2 & IND2_ASCINSERTS    // ascending ins
115:        && citbl->offset > 0                           // not first one
116:        && citbl->offset < (int) pgptr->pfreeoff)      // not last one
117:    {
118:        /*
119:        ** Table is in ascinserts mode, and this is neither the first
120:        ** nor the last row of the page.  Split this page at the
121:        ** point of insertion rather than at midpage.
122:        */
123:        mid = (BYTE *) pgptr->pdata + citbl->offset - 1; // bef. offset
124:    }
125:    else
126:    {
127:        // In default mode, mid points to the middle of the filled
128:        // portion of the page.
129:        mid = (BYTE *) pgptr->pdata +
130:            ((int)(pgptr->pfreeoff - PAGEHEADSIZE) >> 1);
131:    }
132:
133:    // Now, mid points to the place where we would like to split the
134:    // page ideally.  This may not be possible if this puts us in the
135:    // middle of a duplicate key group.  Rest of the code checks
136:    // against that.  Basically, rp is an approx to mid, and splitoff
137:    // gets set rp unless we *are* in the middle of a dupkey group.
138:
139:    /* prestage initial row ptr */
140:    rp = (BYTE *) pgptr->pdata;
141:
142:    /* get rowptr before and after midpage point */
143:    while (rp <= mid)
144:    {
145:        before = rp;
146:        rp += rowsize(rp);
147:    }
148:
149:    if ((rp - (BYTE *) pgptr) == pgptr->pfreeoff)
150:    {
151:        citbl->splitoff = citbl->offset;
152:        return;
153:    }
154:
```

33

```
155:    if (!(citbl->indptr->indstatus & IND_UNIQUE))
156:    {
157:        /* see if we're in a dupkey group */
158:
159:        /* this routine only gets called to determine midpg of
160:        **  a data page - the data row offsets have already been
161:        **  moved to saoffset in the SARGs
162:        */
163:
164:        setkeys(citbl->indptr, before, citbl->indptr->indminlen,
165:            (RID *) NULL);
166:        citbl->sdes->skeyp = citbl->indptr->indkey;
167:        citbl->sdes->skeycnt = citbl->indptr->indkeycnt;
168:        citbl->sdes->sqnext = citbl->sdes->sqoff;
169:        relopconv(citbl->sdes, EQ);
170:
171:        /* if qualpage() returns non-zero then we have dupkey group */
172:        off = rowoffset(rp);
173:        if (qualpage(citbl->sdes, citbl->bp, off, -(off + 1)))
174:        {
175:            /*
176:            ** we have dupkey group - search page to see where
177:            ** it starts - qualify page to see size of group -
178:            ** then we can decide where to split page
179:            */
180:
181:            off = srchpage(citbl->sdes, citbl->bp, FALSE,
182:                SRCH_RET);
183:
184:            /* get size of dupkey group */
185:            dupsize = dupgroup_size(citbl, off);
186:
187:            /* ptr to begin of dupkey group */
188:            before = off + (BYTE *) pgptr;
189:
190:            /* ptr to end of dupkey group */
191:            rp = before + dupsize;
192:
193:            /*
194:            ** split at begin or end depending on whether middle
195:            ** of pg is nearer to begin or end of dupkey group
196:            */
197:
198:            citbl->splitoff = rowoffset(before);
199:            if ((mid - before) > (rp - mid))
200:                citbl->splitoff = rowoffset(rp);
201:            return;
202:        }
203:    }
204:
205:    /*
```

```
                              34
     206:   **  If we have a unique index or in not in middle of
     207:   **   dupkey group, we can use row near middle of pg
     208:   */
     209:
5    210:   citbl->splitoff = rowoffset(rp);
     211:   return;
     212:
     213: }
```

10  (line numbers added for clarity of following description)

The getmidpg method 604 operates as follows. If the table is in ascending insert mode and the offset is greater than the beginning of the page (i.e., offset is greater than 0) but less than the end of the page (i.e., offset is less than freeoff), all checked at lines 112–116, the method proceeds to calculate the split point (splitoff) for this page at the point of insertion (rather than at mid page); this calculation is shown particularly at lines 118–123. Otherwise, the method reverts to the default mode of selecting the midpoint of the page as the point where the page should be split, as shown particularly at lines 125–131.

Next, the method includes steps for checking whether the selected split occurs in the middle of a duplicate key group, which is not allowed. In the instance of a duplicate key group, the method adjusts the split point to the beginning or the end of the group, whichever is closer to the calculated split. This restriction (against splitting a duplicate key group) is an implementation-specific limitation which results from the restriction of SQL Server that no one value can occupy two different pages of the leaf level. The restriction at this point in the method, therefore, is that for duplicate keys a split should occur at the beginning of that group or at the end of that group, but not in the middle of that group. In essence, the method operates by computing mid, which represents an ideal location where to split the page. After computing mid, however, the method then proceeds to see how close to mid it can split the page, yet not split a duplicate key group. After accounting for duplicate key groups, the method sets the splitoff value and returns (lines 210–211). This returns control back to the datasplit function at line 84.

After the return of the recommended splitoff from the getmidpg routine, the datasplit method performs the following additional steps. The method checks whether the calculated splitoff is at the end of the page. In such a case (i.e., where the "if" condition of line 89 holds true), the method treats the insert as if an "ADDEND" (Add to End) mode were set. The "ADDEND" mode is one in which the page is split at the end. Accordingly, in the instance where the splitoff is at the end of the page, the datasplit method proceeds to create a new page and insert the new row on that new page (lines 90–97).

Recall that the "if" statement of lines 62–63 checked whether the mode was explicitly set to "ADDEND." There, the method created a new data page for storing the row to be inserted. In the similar case where the getmidpg method recommends a splitoff at the end of the page, the method proceeds as before: creating a new page for which to insert the row. If the "if" condition does not hold (i.e., splitoff is not at the end of the page), the datasplit method proceeds to perform the actual page split.

The actual splitting is performed by a linksplit method 605 which is passed access to the citbl data structure 610 (via a pointer). This call is made at line 135. First, however, the datasplit method performs other checks before actually making the call to linksplit. Specifically, the datasplit method first determines which of the two pages (i.e., after splitting) will accommodate the insert row. Other conditions are tested as well. In the specific implementation of SQL Server, for instance, the datasplit method determines whether a duplicate key exists on the existing page, in which case the insert row must be treated as part of a duplicate key group (i.e., it cannot straddle two different pages). Another condition tested is the space available in each page after the split. If, after the split, only one of the two pages has sufficient room for storing the insert row, the insert row is stored on that particular page. Further, it may be the case that the insert row will not fit on either page at the splitoff point. In such an instance, a new page is created and the insert row is stored there.

Finally, after the insert row has been stored on a particular page (with the above-described conditions being tested and satisfied), any newly-created page(s) is linked back into the page chain. The linking of a new page in the page chain (and accompanying resetting of page pointers for neighboring pages) may be done in a conventional manner, as known in the database arts. After performing cleanup (e.g., memory de-allocation) of new page and parent memory buffers, the method concludes.

While the invention is described in some detail with specific reference to a single preferred embodiment and certain alternatives, there is no intent to limit the invention to that particular embodiment or those specific alternatives. Those skilled in the art will appreciate that environments from other vendors may be configured in accordance with the present invention. For embodiments where updates are uniformly ascending inserts, for instance, the condition checking for avoiding sub-optimal splitting may be wholly omitted. Similarly, the Server may include Oracle 7, available from Oracle of Redwood Shores, Calif. Still further, those skilled in the art will find that the present invention may be advantageously applied to B-Tree alternatives other than "basic" B-Trees; variants include, for instance, $B^+$-Trees, Prefix $B^+$-Trees, Virtual B-Trees, and Binary B-Trees. Thus, the true scope of the present invention is not limited to any one of the foregoing exemplary embodiments but is instead defined by the appended claims.

What is claimed is:

1. In a database system, said database system storing a plurality of data records as a data table having an index, said index comprising a B-Tree having a plurality of nodes, each node storing a key value for a particular one of said data records, a method for maintaining the B-Tree during updates to the table, the method comprising:

(a) receiving a request for inserting a plurality of new data records into the table;

(b) for each new data record to insert:
  (1) determining a key value for the data record;
  (2) determining a node in the B-Tree for storing the determined key value; and
  (3) if said determined node does not contain sufficient room for storing the determined key value, splitting the node into two nodes by:
    (i) if said plurality of new data records comprises an ascending sequence of records to be inserted into the table, splitting the node at a point where the determined key value for said each data record would have been stored had the node contained sufficient room for storing the determined key value, said point being determined by key values stored in the node; and otherwise
    (ii) splitting the node at a point which is a midpoint for the node.

2. The method of claim 1, wherein said database table comprises at least two columns, each column for storing a particular category of information, and wherein said index comprises a multi-column index.

3. The method of claim 1, wherein said B-Tree comprises a root node, a plurality of internal nodes, and a plurality of terminal nodes.

4. The method of claim 3, wherein said index is a clustered index, and wherein said terminal nodes of said B-Tree store said plurality of data records.

5. The method of claim 3, wherein said terminal nodes of said B-Tree store record identifiers, each record identifier uniquely identifying a particular one of said data records.

6. The method of claim 1, wherein said table stores first and second columns of values, and wherein said plurality of new data records all store an identical value for the first column and store a value for the second column which monotonically increases for all of said new data records.

7. The method of claim 6, wherein said new data records comprise an ordered set of data records, wherein values for the first column are fixed to a single value, and wherein values for the second column increase in an ascending fashion.

8. In a database system, said database system storing a plurality of data records as a data table having an index, said index being a single-column index, said index comprising a B-Tree having a plurality of nodes, each node storing a key value for a particular one of said data records, a method for maintaining the B-Tree during updates to the table, the method comprising:

(a) receiving a request for inserting a plurality of new data records into the table wherein said new data records comprise an ordered sequence of records, each one storing for the first column a value which always increases when compared to a previous record which has been stored in a table;

(b) for each new data record to insert:
 (1) determining a key value for the data record;
 (2) determining a node in the B-Tree for storing the determined key value; and
 (3) if said determined node does not contain sufficient room for storing the determined key value, splitting the node into two nodes by:
  (i) if said plurality of new data records comprises an ascending sequence of records to be inserted into the table, splitting the node at a point where the determined key value for said each data record would be stored; and otherwise
  (ii) splitting the node at a point which is a midpoint for the node.

9. The method of claim 1, wherein said splitting the node at the insertion point step comprises:

determining where the determined key value would be stored if the node contained sufficient room;

creating a new node by splitting said node into first and second nodes; and transferring to the second node key values which were stored in said node beyond the determined insertion point.

10. The method of claim 9, further comprising:

inserting a particular data record into the table by storing the record in said first node at a position just beyond the determined insertion point.

11. In a system storing a B-Tree index comprising a plurality of nodes, each node storing data values from particular data records, a method for splitting a particular node of the B-Tree during insertion of new data records when the node does not contain sufficient room for storing a data value from one of the new records, the method comprising:

(a) if said B-Tree index comprises a multi-column index, determining whether said new data records to be inserted comprise an ascending insert sequence, said ascending insert sequence comprising data records storing a fixed value for a first column and a value for a second column which increases within the context of the value stored in the first column;

(b) if said new data records to be inserted comprise an ascending insert sequence, splitting the particular node at a point where data values for a new data record would have been stored had the node contained sufficient room for storing the key value of the new record, said point being determined by key values stored in the node; and (c) if said new data records to be inserted do not comprise an ascending insert sequence, splitting the particular node at a point which is a midpoint for the node.

12. The method of claim 11, wherein said first column stores a number for a particular department, and wherein said second column stores an ascending sequence of numbers which always increases for the department.

13. The method of claim 12, wherein said sequence of numbers which always increases for the department comprise a selected one of purchase order numbers, invoice numbers, customer numbers, and employee numbers.

14. The method of claim 11, wherein step (b) comprises:

splitting said node into an original node and a new node; and storing the new data record which caused the split with said original node.

15. The method of claim 14, further comprising:

if insufficient room exists at said original node for storing the new data record which caused the split, storing said new data record in said new node.

16. The method of claim 15, further comprising:

if insufficient room exists at said new node for storing the new data record which caused the split, creating an empty node for storing said new data record.

17. The method of claim 11, wherein said B-Tree index comprises a selected one of a basic B-Tree index and a variant B-Tree index.

18. The method of claim 17, wherein said variant B-Tree index comprises a $B^+$-Tree index.

19. The method of claim 11, further comprising:

(d) when splitting the particular node at a point where data values for a new data record would have been stored, first determining whether said splitting would split a group of duplicate keys stored by the particular node; and (e) if said splitting would split a group of duplicate keys, splitting the particular node at a point to either side of said group of duplicate keys.

20. The method of claim 19, wherein said (e) includes:

splitting the particular node at a point to either side of said group of duplicate keys which is closest to the point where data values for a new data record would have been stored.

21. A data processing system comprising:

a database server connected to at least one client, said database server storing a database table having a multi-column index, said multi-column index comprising a B-Tree index on at least first and second columns of said database table, said B-Tree index comprising a plurality of pages storing a fixed number of key values derived from said at least first and second columns;

means for requesting insertion of new data records from said at least one client into said database table, said data records being ordered by said multi-column index;

means for determining whether values in the first column of said new data records are fixed to a single value and values in the second column increase in an ascending fashion;

means for inserting key values from said new data records into particular pages of said B-Tree index, wherein at least one page overflows as a result of an attempt to insert a key value from one of said new data records; and means, responsive to said determining means and said inserting means, for splitting at an insertion point said at least one page which overflowed, wherein said insertion point being (a) a point of said at least one page where the key value attempted to be inserted would have been stored had the page not overflowed, said insertion point being determined by key values stored in the page, if said determining means determines that said values in the first column of said new data records are fixed to a single value and values in the second column increase in an ascending fashion, and otherwise (b) a midpoint of said at least one page.

22. The system of claim 21, wherein said determining means comprises:

means for communicating from at least one client to said database server that values in the first column of said new data records are fixed to a single value and values in the second column increase in an ascending fashion.

23. The system of claim 22, wherein said communicating includes:

means for generating an SQL command setting said database table in an ascending insert mode.

24. The system of claim 21, wherein said determining means further comprises:

means for monitoring key values of said new data records actually inserted for confirming that values in said first column are fixed to a single value and values in said second column increase monotonically in an ascending fashion.

25. The system of claim 21, wherein said determining means further comprises means for monitoring for a probability that values in said first column are fixed to a single value and values in said second column increase monotonically in an ascending fashion occur, and wherein said splitting means further comprises means for splitting a page which has overflowed at its midpoint if said probability falls below a pre-selected threshold.

* * * * *